United States Patent
Benedetti

(10) Patent No.: US 12,104,590 B2
(45) Date of Patent: Oct. 1, 2024

(54) VALVE FOR DENTAL SUCTION SYSTEMS

(71) Applicant: CEFLA Società Cooperativa, Imola (IT)

(72) Inventor: Jarno Benedetti, Imola (IT)

( * ) Notice: Subject to any disclaimer, the term of this patent is extended or adjusted under 35 U.S.C. 154(b) by 0 days.

(21) Appl. No.: 17/937,366

(22) Filed: Sep. 30, 2022

(65) Prior Publication Data

US 2023/0113668 A1   Apr. 13, 2023

(30) Foreign Application Priority Data

Oct. 13, 2021  (IT) ..................... 102021000026171

(51) Int. Cl.
| | |
|---|---|
| *F04B 53/10* | (2006.01) |
| *A61C 17/12* | (2006.01) |
| *F16K 1/42* | (2006.01) |
| *F16K 7/12* | (2006.01) |
| *F16K 7/17* | (2006.01) |

(52) U.S. Cl.
CPC .............. *F04B 53/10* (2013.01); *A61C 17/12* (2019.05); *A61C 17/125* (2019.05); *F16K 1/42* (2013.01); *F16K 7/12* (2013.01); *F16K 7/17* (2013.01)

(58) Field of Classification Search
CPC ....... F04B 53/10; A61C 17/12; A61C 17/125; A61C 17/13; F16K 1/42; F16K 7/12; F16K 27/0236; F16K 31/402
See application file for complete search history.

(56) References Cited

U.S. PATENT DOCUMENTS

| | | | | |
|---|---|---|---|---|
| 3,763,862 A | | 10/1973 | Speith | |
| 4,284,212 A | * | 8/1981 | Caswell | B67D 7/36 141/59 |
| 4,715,578 A | * | 12/1987 | Seltzer | F16K 7/17 92/103 SD |
| 6,254,057 B1 | * | 7/2001 | Pubben | F16K 7/17 137/625.25 |

(Continued)

FOREIGN PATENT DOCUMENTS

| | | |
|---|---|---|
| AT | 521888 | 6/2020 |
| DE | 8816512 | 9/1989 |

OTHER PUBLICATIONS

Italian Patent and Trademark Office, Search Report, May 11, 2022—Relevant portions are in English.

*Primary Examiner* — Patrick C Williams
(74) *Attorney, Agent, or Firm* — Themis Law

(57) ABSTRACT

A suction valve for a dental treatment unit is connected to a downstream suction system and includes input and output conduits; a valve seat interposed therebetween; a diaphragm defining a chamber by moving between a resting position against the valve seat, blocking flow between the input and output conduits, and an active position distanced from the valve seat, allowing fluids to pass; a connecting conduit between the chamber and the output conduit and having an air entry point; and a pilot valve switched between a resting position, allowing air passage to the chamber through the connecting conduit and having a first portion, a closing point, and a second portion, and an active portion blocking air passage. A non-return valve at the entry point prevents an input flow to the connecting conduit and the upwelling of liquids from the output conduit to the pilot valve and/or the chamber.

9 Claims, 10 Drawing Sheets

(56) References Cited

U.S. PATENT DOCUMENTS

| | | | |
|---|---|---|---|
| 2010/0051116 A1* | 3/2010 | Martin | F16K 31/402 137/400 |
| 2016/0116076 A1* | 4/2016 | Fatherazi | F16K 27/08 251/215 |
| 2017/0037975 A1* | 2/2017 | Weingarten | F16K 7/17 |

* cited by examiner

VALVE FOR DENTAL SUCTION SYSTEMS

FIELD OF THE INVENTION

The present invention relates to the technical field of dental treatment units. In particular, the present invention relates to an improved valve for the suction system, typically provided inside dental treatment units.

SUMMARY OF THE INVENTION

Dental treatment units are complex machines that have been industrially produced since the beginning of the 20$^{th}$ century. Dental treatments units comprise different portions described later in the detailed description of FIG. 1.

It is worth underlining that dental treatment units are durable equipment, intended for a service life lasting about 5-10 year, which can reach up to 20 years and beyond. It is apparent that in this long period of time, dental treatment units will undergo a series of planned maintenance interventions by a maintenance technician, and probably even repair interventions following failures.

Typically, said dental treatment units are used to perform dental therapies on a patient laying or seating on dental chair. During therapies, typically dentists use dental instruments supported by a dentist's board, instruments often provided with an air/water spray. Moreover, the patient undergoing therapy continually secretes saliva and can bleed during therapy. Finally, during therapies debris is generated due to the use of dental instruments, e.g., small pieces of enamel, dentin, old amalgam or aesthetical material fillings. In order to keep the operative field clean, in the art it is known to perform said therapies while a suction system is active, which removes water, saliva, blood and solid debris (enamel, dentin, amalgam, polymeric materials) from the oral cavity of the patient. Said suction is performed by placing in the oral cavity of the patient a disposable or sterilisable suction cannula, which is mounted on a tube holder terminal at the end of a suction tube, in its turn connected to the water unit.

Typically, suction tubes are corrugated tubes, with the aim of conferring the robustness needed in order to prevent their collapsing under the action of suction.

In the art, it is customary to provide a suction system placed downstream said dental treatment unit. In the case of dental practices provided with a plurality of dental treatment units, a suction system is often connected to a plurality of dental treatment units. Said suction system generates vacuum, which in turn generates a suction flow that removes saliva, blood and detritus from patient's oral cavity. There are known suction systems of different kinds: dry line suction systems, wet line suction, etc.

In the case of dry line suction systems, said suction flow containing materials coming from the patient's oral cavity passes through a canister allowing to separate air from the liquid and solid content of the suction flow. Typically, the liquid is drained in the drain of the dental treatment unit, while solids are retained by said canister, which must be emptied and cleaned periodically.

In the case of wet line suction systems, said suction flow containing materials coming from the patient's oral cavity is drained directly in the suction system of the dental treatment unit.

There are provided two cases wherein a suction valve according to the present invention is needed:

In a dental practice provided with a plurality of dental treatment units, the suction system is connected to said plurality of dental treatment units. When one of said dental treatment units activates suction, all the suction cannulas placed on the other dental treatment units in the practice would start to suction in the absence of a valve like that of the present invention.

Typically, each dental treatment unit is provided with two suction cannulas having different diameters, see FIG. 1, which are used alternatively. When the suction system is activated, both cannulas start suctioning air, causing noise and a pressure drop. When the dentist/assistant withdraws one of the two cannulas and inserts it in the patient's oral cavity, the other, undergoing the action of the suction systems, stays in its seat on the assistant's table, causing non-necessary noises and pressure drop, in the absence of a valve like that of the present invention.

In the lower end dental treatment units, each treatment unit is provided with a suction valve allowing the connection of the different dental treatment units placed in a dental practice comprising at least two dental treatment units, each valve according to the present invention being provided on the tubing leading to the suction system placed downstream the dental treatment units.

In order to prevent noise and pressure drop by the suction cannula not inserted in the patient's oral cavity (the non-used cannula remains in its seat on the dental assistant's table), there are typically two possibilities:

The dental treatment unit is provided with a suction valve according to the present invention, allowing the working of the suction for the withdrawn cannula only (upper range dental treatment units);

The unused cannula is manually closed (lower range dental treatment units).

In the case of dental practices provided with a plurality of dental treatment units connected to the same suction systems, a single (upper range) dental treatment unit might be provided with three valves according to the present invention: one valve for each of the two cannulas, and a third valve placed on the tubing leading to the suction systems.

Said suction valves are well known in the art and have been industrially produced for many years. The documents quoted hereunder represent the known art for said suction valves. It is worth noting that the numbers quoted in the known art documents are the numbers indicated in the single document.

DE2037197B1 to Kaltenbach & Voigt, published in 1972, describes a suction valve wherein there is provided a conduit 38, 39, 40, 41 allowing the connection of the suction conduit 31 to the chamber above a diaphragm 28 through a pilot valve 30. Said suction conduit is not provided with a non-return valve.

U.S. Pat. No. 3,763,862A to Duerr Dental, published in 1973, describes a suction valve, provided with a conduit 30a connecting the suction conduit to the chamber above a diaphragm 25, through a selection valve 31. This valve, too, is not provided with a non-return valve.

U.S. Pat. No. 4,099,701A to Benjamin Leopold Berger, published in 1978, describes a solenoid valve provided with a suction conduit 8a connecting the top chamber to a diaphragm 4 through a selection valve 6. The spring which normally actuates the diaphragm is eliminated. This valve, too, is not provided with a non-return valve.

EP0505885A1 to Siemens AG, published in 1992, discloses a suction valve provided with a connection tubing 12 placed between suction conduit and chamber above the diaphragm through a valve 14. This valve, too, is not provided with a non-return valve.

WO9503751A1 to Trawoeger and Pregenzer (Metasys), published in 1995, describes a suction valve provided with a shutting-off mechanism associated on the one hand with the suction channel and on the other hand with a supply channel that feeds a supplementary medium to the suction channel. Each of the two channels can be open or closed at the same time or alternatively. With the contemporary aperture or closure the supplementary medium can be provided to the suction channel during the working of suction. Said suction valve is provided with a suction conduit 24, 6, 14 connecting the suction channel to the chamber 7 above a diaphragm 8. This suction valve, too, is not provided with a non-return valve.

EP0749728A1 to Cattani S.p.A., published in 1996, describes a suction valve provided with a suction conduit 7 connecting the suction conduit 9 to the chamber 10 above the diaphragm 4 through a selection valve 8. This suction valve, too, is not provided with a non-return valve.

AT521888A1 to Bruno Pregenzer (Metasys), published in 2020, discloses a suction valve provided with a conduit 43 connecting the suction conduit 52 to the above chamber 22 through a selection valve 60. This suction valve, too, is not provided with a non-return valve.

It is worth noting that the companies (Duerr Dental, Siemens AG, Cattani S.p.A., Metasys) owning the patents quoted as known art represent the most reputed manufacturers of dental medical devices. The problems of noise, pressure drop in the suction system, and of the service life of suction valves have been known in the art for many years and have not found a satisfying solution yet.

SUMMARY OF THE INVENTION

Aim of the present invention is providing an improved suction valve, having a service life longer than that of the valves on the market, including the suction valve presently produced by the applicant. In particular, one of the aims of the invention is preventing failures in the suction valve, so preventing emergency interventions causing downtimes to dental treatment units.

This object is achieved by an apparatus having the features of the independent claims. Advantageous embodiment and refinements are specified in the claims dependent thereon.

According to the present invention, the suction valve is provided with the same main portions as the known art valves. In particular, the suction valve according to the present invention comprises an input conduit, an output conduit, and a connecting conduit provided with a diameter smaller than the previous two. Said connecting conduit leads from the output conduit to a chamber placed above a diaphragm arranged transversally to said input conduit and output conduit. The diaphragm keeps the valve in a normally closed position.

In particular, the invention relates to a valve wherein between the output conduit and the input conduit there is provided a valve seat. Said valve seat cooperates with the diaphragm, so that when said diaphragm is pushed against said valve seat, the passage between said two output and input conduit is interrupted, while when the diaphragm is uplifted from the valve seat, the passage between output conduit and input conduit is open.

In a preferred embodiment, the present invention provides two conduits, an output conduit and an input conduit, which are oriented with their longitudinal axes according to incident directions, in particular according to two perpendicular directions. Said conduits in the crossing zone form a contact edge along the internal part of the angle surrounded by them, which has an arcuate saddle shape. Said contact edge constitutes the valve seat, with which the facing side of a flexible diaphragm cooperates. The flexible diaphragm is arranged in a secant way with respect to both longitudinal axes of the input and output conduit, respectively, and with respect to the external side of the angle zone filleting the conduits. Said diaphragm is elastically deformable against said contact edge, so as to close the passage between the output conduit and the input conduit, through a pressure on the side of the diaphragm, opposed to the contact one with said contact edge, while said diaphragm takes a position distanced from said contact edge when it is not pushed against the edge.

According to the present invention, in the suction valve said input conduit and output conduit are preferably perpendicular. Said connecting conduit is provided with an entry point that preferably protrudes in the output conduit, and at the entry point of said connecting conduit there is provided a non-return valve. Such non-return valve allows the emptying of the suction valve in the opening step of the valve, preventing the upwelling of dirt/liquids.

In a preferred embodiment, the connecting conduit is provided for the main part of its length outside the body of said valve.

In a preferred embodiment, said non-return valve is an umbrella valve.

In a preferred embodiment, the non-return umbrella valve is preloaded.

In an alternative embodiment, said non-return valve is provided in the form of duck bill valve, or a ball valve.

In a preferred embodiment, the entry point of the connection conduit inside the suction valve is placed perpendicularly to the airflow.

The advantages of the present invention are manifold.

The first advantage is preventing the upwelling of water and dirt inside the valve, so prolonging the service life of the valve itself.

A second advantage is that the connecting conduit placed outside the body of the valve makes its industrial production easier.

A third advantage is that the particular position of the entry point of the connecting point reduces the possibility of liquid upwelling.

A fourth advantage is that it was experimentally verified that with the valves according to the known art, the position of installation of the valve affects the duration of the service life of the valve, with a marked worsening (shorter service life) when said valve is installed tilted up to 45°. With the valve according to the present invention, any degree of tilting affects neither the working of the valve nor the duration of its service life.

BRIEF DESCRIPTION OF THE DRAWINGS

Further advantages and properties of the present invention are disclosed in the following description, in which exemplary embodiments of the present invention are explained in detail based on the drawings.

DETAILED DESCRIPTION OF EMBODIMENTS OF THE INVENTION

Figure 1:
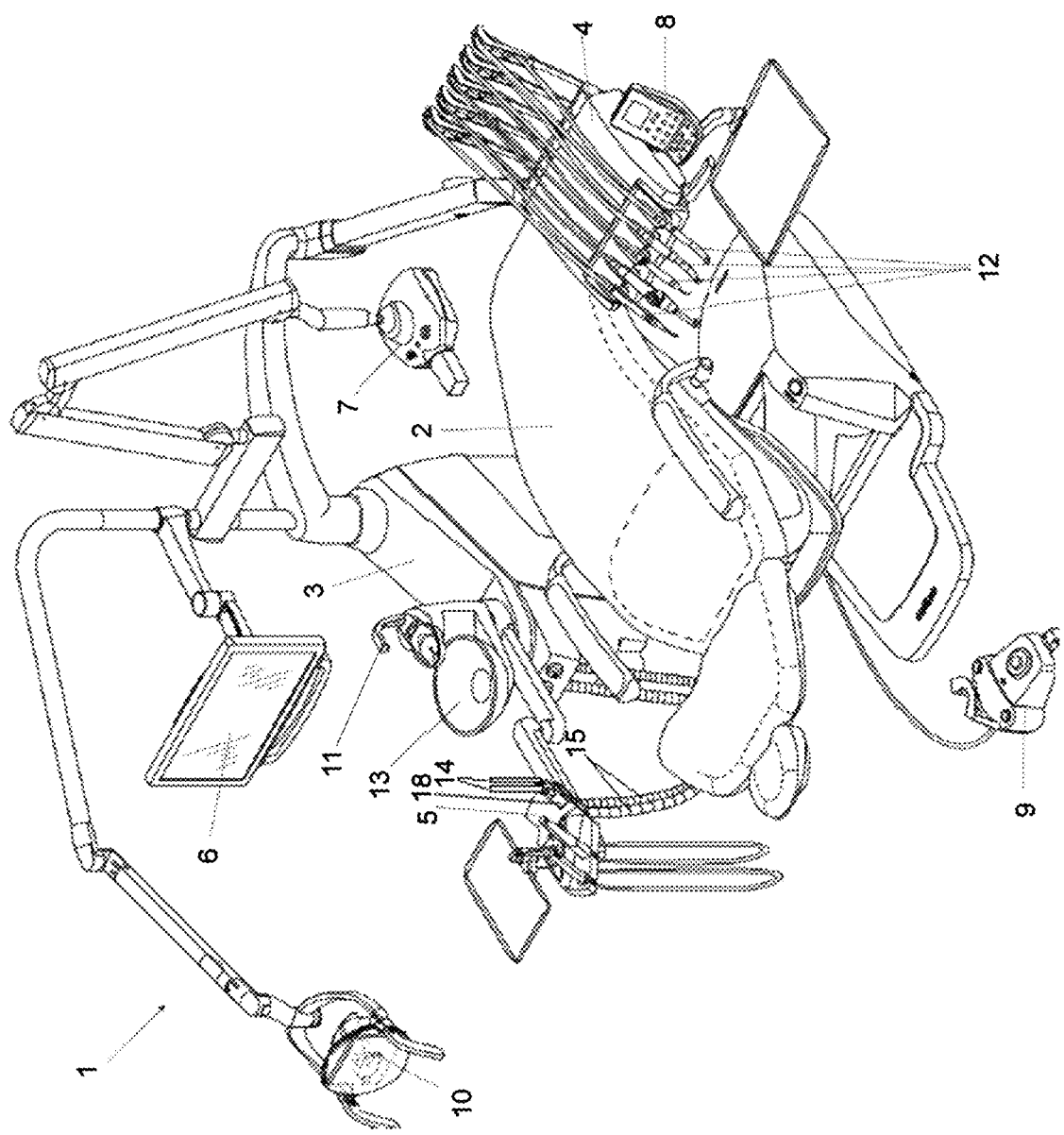
FIG. 1 is an axonometric view of a typical dental treatment unit.

FIG. 1 shows a dental treatment unit 1 according to the known art, comprising a patient chair 2 for a (not shown) patient and a water unit 3. The water unit 3 typically supports a bowl 13; a dentist's board 4 provided with a dentist's control console 8 for inputting commands, and a plurality of dental instruments 12 supplying water (air/water syringe, micromotor, turbine, calculus scaler, etc.); an assistant's board 5; an operating lamp 10. The water unit 3 is also provided with a water-to-cup spout 11 for supplying water to a (not shown) glass. The dental treatment unit 1 is provided with a foot control 9 and can optionally comprise a screen 6 and an intraoral X-ray unit 7.

On the assistant's table 5 there are provided at least two suction cannulas 14, to be inserted into patient's oral cavity, mounted on respective suction tube terminals 18 applied to the distal end of respective suction tubes 15. Traditionally the cannulas are of two different measures, one having a larger diameter, and the other having a smaller diameter. Said cannulas 14 are connected through said suction tubes 15 to said water unit 3. It is known in the art that the seat of said cannula terminals 18 on the assistant table 5 comprises a micro switch, allowing to electrically actuate the valves of the suction system placed downstream.

The suction valve according to the present invention is a traditional component of dental treatment units and is typically placed at the proximal end of suction tubes 15, in a position not visible in FIG. 1. Alternatively or in addition, said suction valve is interposed along the tubing connecting the dental treatment unit to the downstream suction system, in a position not visible in FIG. 1. In all cases, the suction system is placed downstream the dental treatment unit, often in a special engine room.

Figure 2:
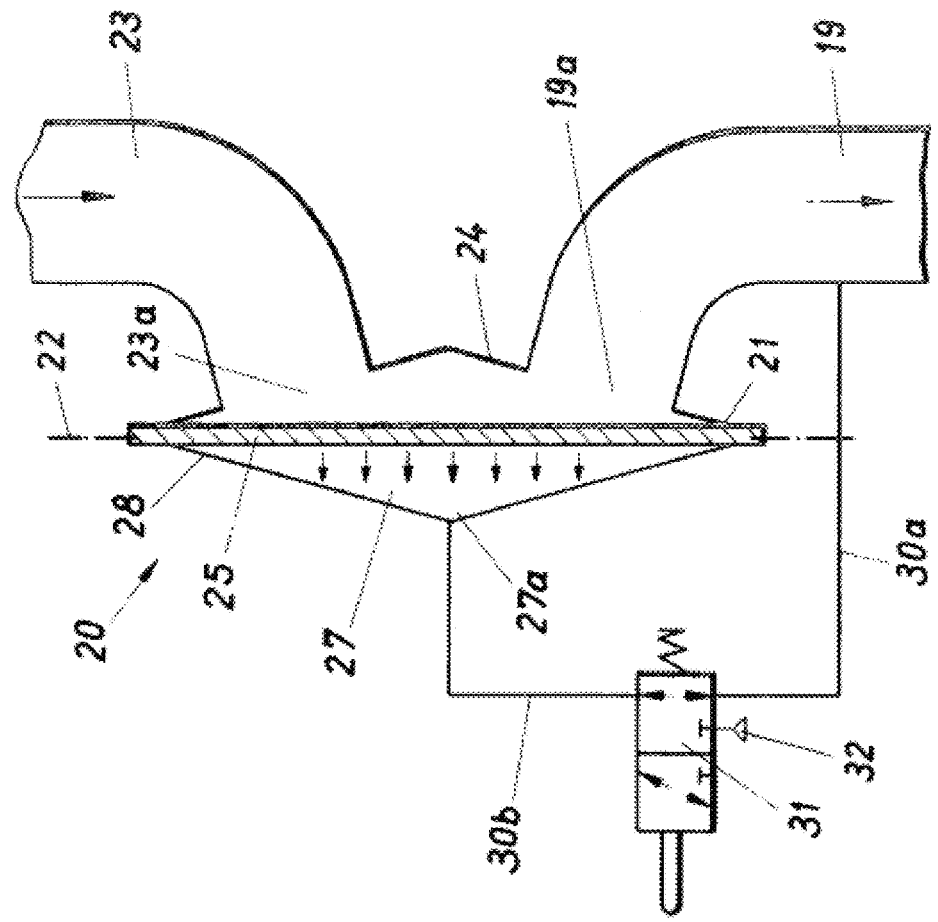
FIG. 2 is representative of the prior art and illustrates a valve as disclosed in U.S. Pat. No. 3,763,862.

FIG. 2 shows a suction valve according to the known art, in particular according to U.S. Pat. No. 3,763,862, wherein the output conduit 19 connected to the downstream suction system is intercepted by a connecting conduit 30a leading to the chamber 27 above a diaphragm 25 through a selection valve 31.

In the normal working conditions of the suction system, the suction valve is open, and therefore the diaphragm 25 is uplifted, which allows the passage of the suctioned flow in the conduits 23 and 19. This causes an upwelling of liquid and dirt in the conduit 30a which jeopardizes the working of the solenoid valve 31.

Figure 3B:
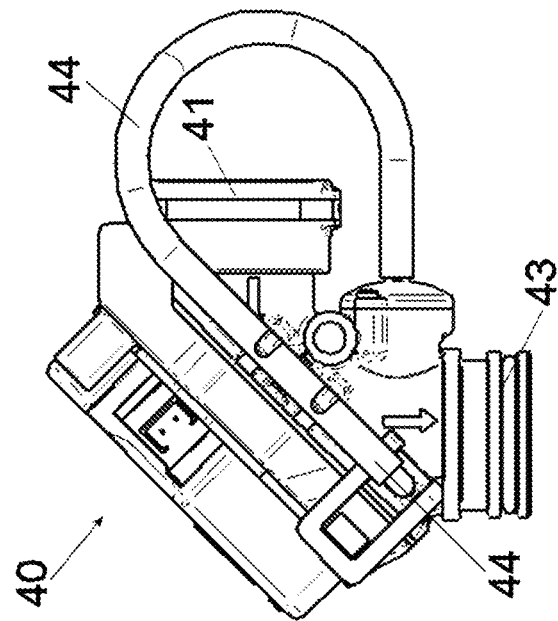
FIG. 3A, 3B is an axonometric and lateral view of a valve according to the present invention.
Figure 3A:
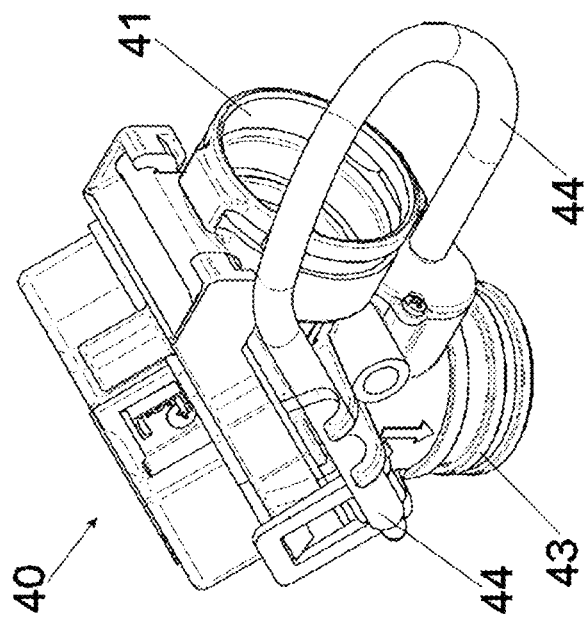

FIGS. 3A, 3B show the suction valve 40 according to the present invention in an axonometric and in a side view, respectively. Said valve 40 is produced in a plastic material, preferably polybutylene terephthalate (PBT), which is a material resistant to chemical aggression.

Said Figures show the suction valve 40 according to the present invention, comprising an input conduit 41, an output conduit 43, and a connecting conduit 44 provided with a diameter smaller than the previous two. Said connecting conduit 44 is provided with en entry point 52 (FIG. 4) that preferably protrudes in the output conduit 43. Said input conduit 41 and output conduit 43 are preferably perpendicular. Said connecting conduit 44 leads from the output conduit 43 to a chamber 46 placed above a diaphragm 42 which keeps the valve 40 in a normally closed position (see FIGS. 4-8). In FIGS. 4-8, said connecting conduit 44 is visible in part as a dashed conduit.

Figure 4:
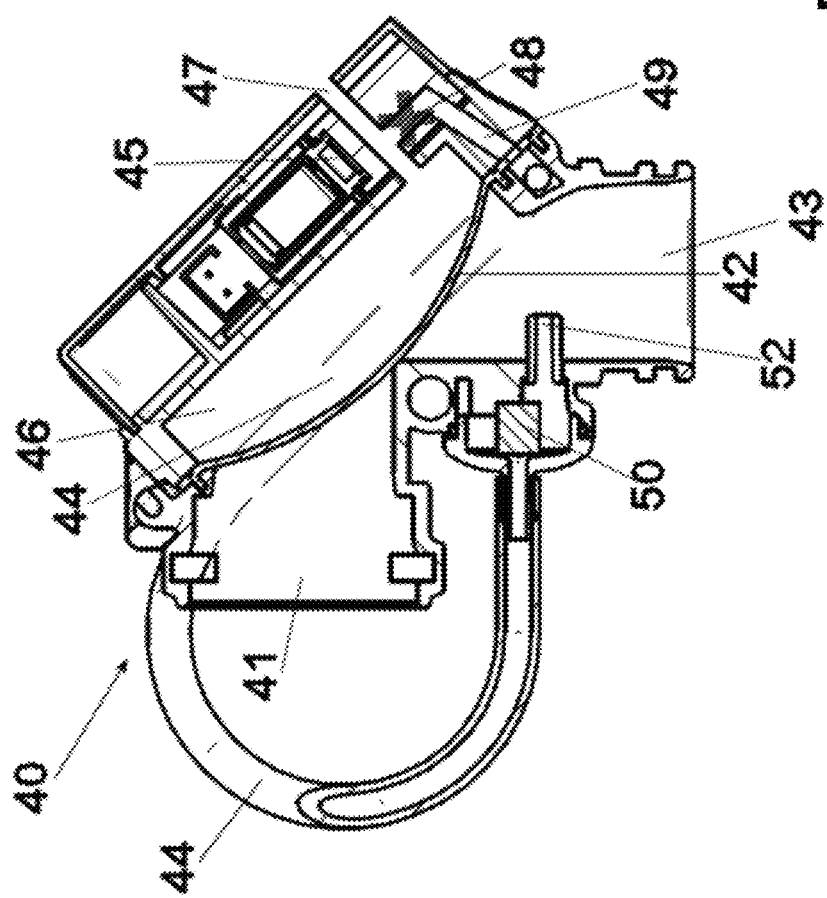
FIG. 4 is a longitudinal section of a valve according to the present invention, with non-active suction system.

FIG. 4 shows the suction valve 40 according to the present invention in a longitudinal section, which allows to compare it with the known art valve shown in FIG. 2. Comparing FIG. 2 (known art) and FIG. 4 is easy to observe that said two valves share the main components. The input conduit 23 of FIG. 2 corresponds to the input conduit 41 according to the present invention; the diaphragm 25 of FIG. 2 corresponds to the diaphragm 42 of the present invention, while the output conduit 19 of FIG. 2 corresponds to the output conduit 43 of the present invention. The connecting conduit 30a of FIG. 2 corresponds to the connecting conduit 44 of the present invention. The selection solenoid valve 31 of FIG. 2 corresponds to the pilot valve 45 of the present invention.

FIG. 4 shows the suction valve 40 in its resting condition, i.e., when the suction system is inactive. FIG. 4 shows that the suction valve 40 is a normally closed valve, i.e., at atmospheric pressure the conformation of the diaphragm 42 is such to close both conduits 41 and 43. In particular, said diaphragm 42 is placed transversally to both said conduits 41 and 43.

The conduit 41 is connected upstream to the suction cannula 14 through a corrugated tubing 15, or alternatively to the (not shown) tubing connecting a dental treatment unit 1 to a (not shown) suction system, placed downstream said dental treatment unit. The rubber diaphragm 42, due to its conformation, blocks said two conduits 41, 43, preventing them from communicating. In the suction valve 40 there is provided a top chamber 46, which is delimited at its bottom by said rubber diaphragm, while the other walls are formed by the body of the suction valve 40.

Said suction valve 40 further comprises:
- a pilot valve 45 electrically controlled, placed superiorly to said conduit 43,
- an internal portion of the connecting conduit 44 formed by a first portion 47 of the conduit, a closure point 48 and a second portion 49 of conduit; said internal portion is substantially the end portion of the connecting conduit 44, said internal terminal portion being embedded in the body of the valve 40;
- a non-return valve 50 which is the new and inventive portion of the present invention with respect to the known art shown in FIG. 2; said valve is placed at the entry of the connecting conduit 44.

When said pilot valve 45 is not electrically supplied (resting position), the conduit 47 connects the external environment with the top chamber 46. When the pilot valve 45 is electrically supplied, the closing of the conduit 47 in the point 48 blocks the passage of environmental air, while the opening of the conduit 49 connects the top chamber 46 with the output conduit 43 through the connecting conduit 44.

It is worth noting that, thanks to the micro switch on the assistant's table 5, the extraction of a suction cannula 14, in particular of the cannula terminal 18, from its seat in the assistant's table 5 triggers the electrical impulse for the opening switching of the pilot valve 45. On the other end, the positioning of the cannula terminal 18 back to its seat in the assistant's table 5 closes the pilot valve 45.

FIGS. 4-8 show, like frames of a movie, what happens inside the suction valve 40 when the (not shown) suction system is activated, connected downstream the suction valve 40.

Figure 6:
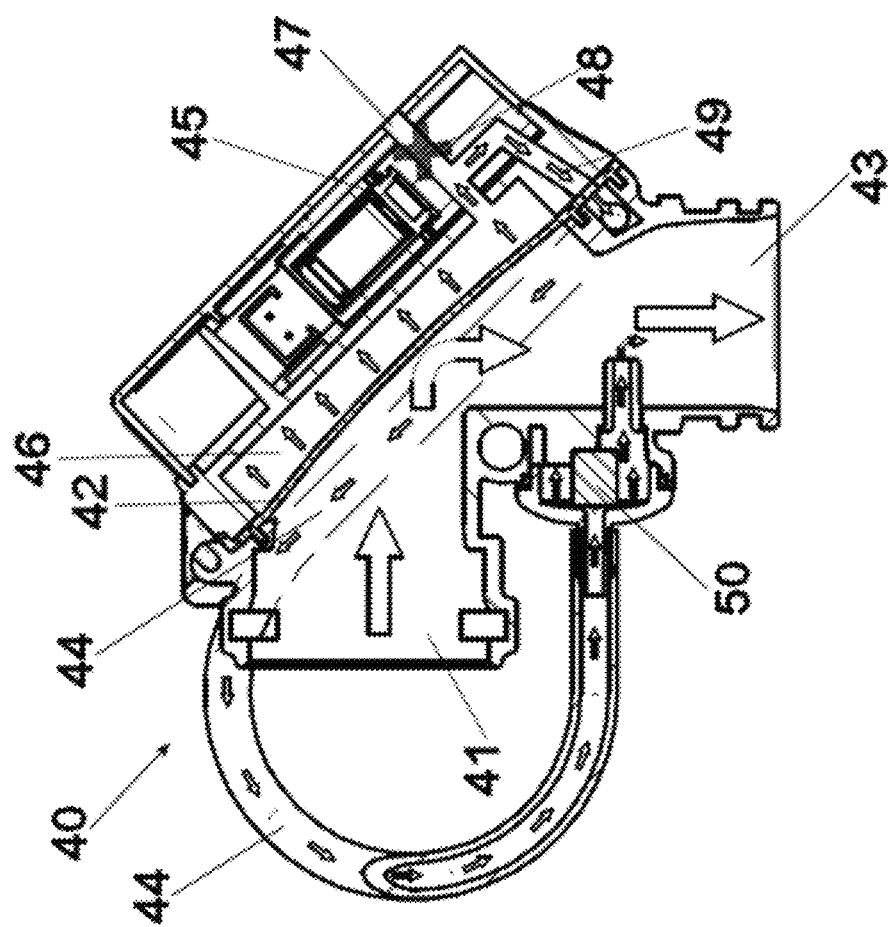
FIG. 6 shows a longitudinal section of a valve according to the present invention, with active suction system—switching step of the open valve.
Figure 7:
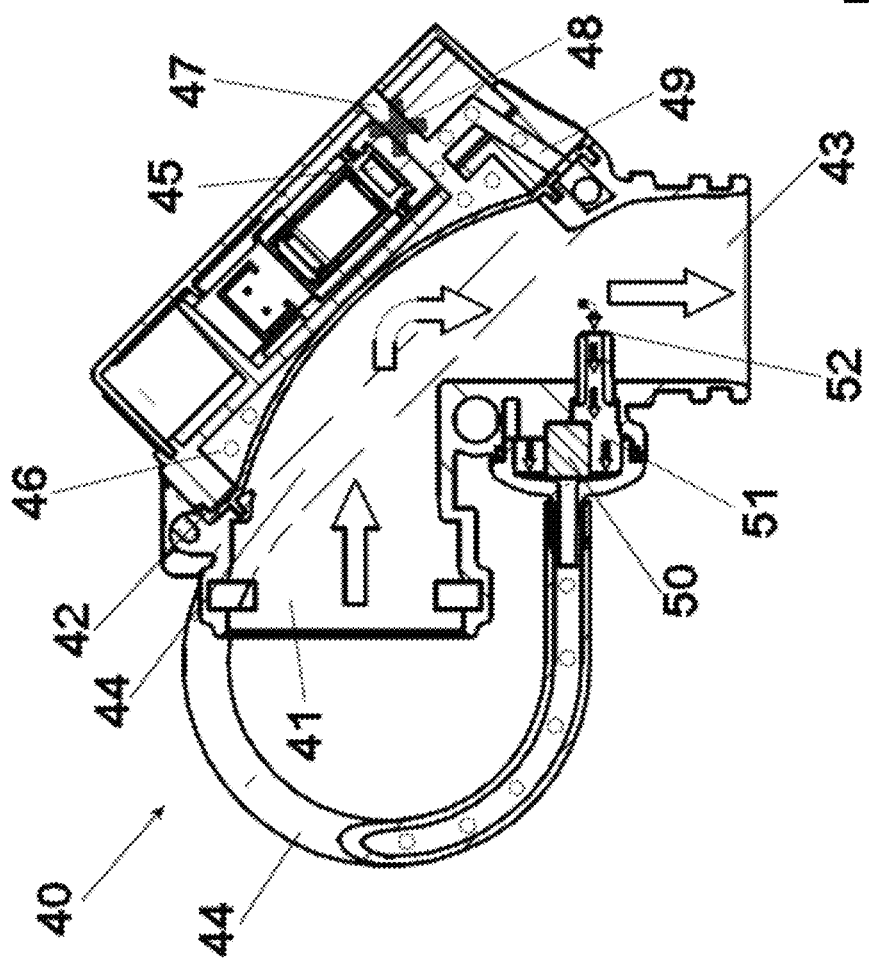
FIG. 7 shows a longitudinal section of a valve according to the present invention, with active suction system—the valve is completely open.
Figure 8:
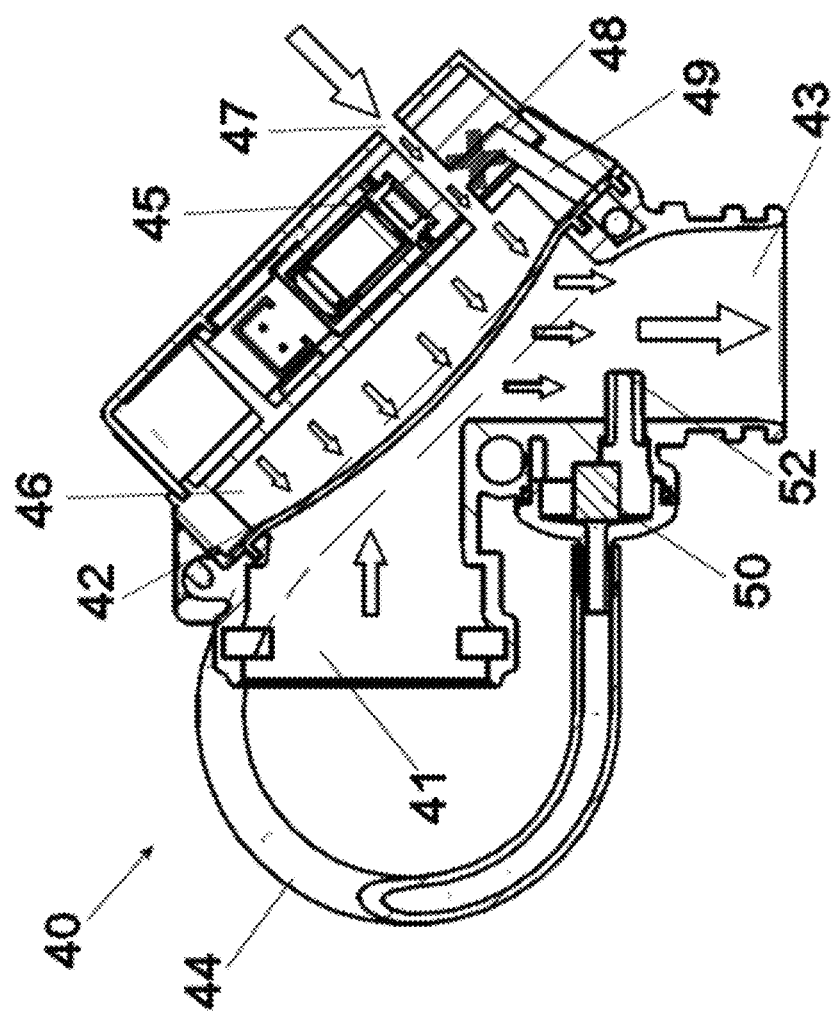
FIG. 8 shows a longitudinal section of a valve according to the present invention, with active suction system—switching step of the closed valve.

It is worth noting that the activation of the suction valve 40 occurs through successive steps:

I. When the dental treatment unit 1 is switched off, and the suction system is switched off, while the cannula terminal 18 is in its seat in the assistant's table 5, the suction valve 40 has the conformation shown in FIG. 4;

II. In a first moment when the (not shown) suction system placed downstream said dental treatment unit is activated, the suction valve 40 takes the conformation shown in FIG. 5;

III. Successively, the extraction of one of the two cannula terminals 18 from the assistant's table 5 activates the micro switch in the assistant's table, which electrically activates the pilot valve 45 as shown in FIG. 6; the beginning of airflow uplifts the diaphragm 46;

IV. Successively, the emptying of the top chamber 46 causes the maximal uplifting of the diaphragm 42, connecting the input conduit 41 with the output conduit 43 as shown in FIG. 7;

V. When the cannula terminal 18 is placed back in its seat in the assistant's table 5, the pilot valve 45 switches, blocking the conduit 49 and opening the conduit 47, as shown in FIG. 8. The suction valve 40 first goes back to the condition shown in FIG. 8 and finally to the condition of FIG. 5, with active suction system, and pilot valve 45 in its resting condition.

Figure 5:
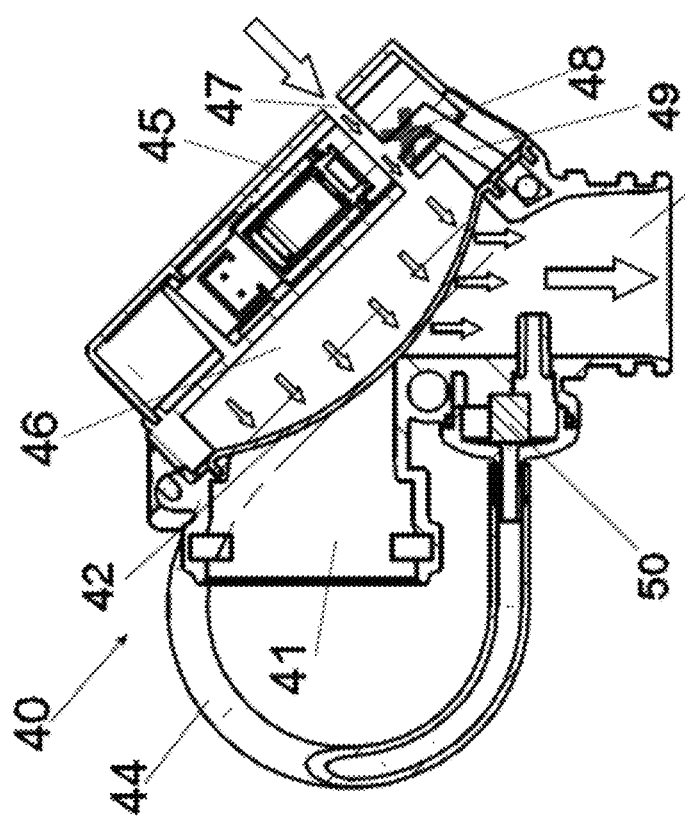
FIG. 5 shows a longitudinal section of a valve according to the present invention, with active suction system—closed valve.

FIG. 5 shows the working condition that occurs when the suction system is activated, and therefore air, indicated by the bigger white arrows, arrives to the suction valve 40, coming from the environment and being sucked through the output conduit 43 connected to the suction system. The smaller white arrows show the action of air on the diaphragm 42.

With the activation of the suction system, the output conduit 43 undergoes depression, which further draws the diaphragm downward, ensuring/improving the seal of the input conduit 41. In such condition, the pilot valve 45, not electrically supplied, connects the camera 46 with the atmosphere through the conduit 47. The conduit 49 is closed in the point 48.

FIG. 6 shows the working condition that occurs in the following moment, when the pilot valve 45 is opened through an electrical impulse coming from the micro switch (switching step of the opened valve) caused by the extraction of the cannula terminal 18 from its seat on the assistant's table 5. The pilot valve 45 closes the conduit 47 in the closing point 48, connecting the output conduit 43 with the chamber 46 above the diaphragm 42. In the chamber 46 there is provided a condition of a pressure lower than the pressure in the input conduit 41 (atmospheric pressure) and this allows the upward flexing of the diaphragm, connecting the output conduit 43 with the input conduit 41. The small white arrows show the overall path of the airflow. In this condition, the suction flow is activated.

The small white arrows of the camera show the direction of movement of air, and the direction of uplifting of the diaphragm. The air substantially follows the path indicated by the small white arrows: from the camera 46 it enters into the internal conduit 49, then into the connecting conduit 44, entering in the external portion of the connecting conduit 44 that is dashed in the Figure, finally reaching the output conduit 43. The conduit 49 is the terminal portion of the connecting conduit 44.

FIG. 7 shows the condition following the preceding one, wherein, with the activated suction system, the complete opening of the suction valve 40 occurs.

The maximal opening of the suction valve 40 is obtained with the complete upward flexing of the diaphragm 42, and the simultaneous complete emptying of the camera 46. In such condition, the circulation of air in the conduit 44 is stopped, indicated by white dots. This stasis condition, inside the connecting conduit 44, leads to the possible upwelling of liquids/dirt inside the connecting conduit 44, due to turbulences generated at the input point 52 of the connecting conduit 44, which is what occurs in the valves according to the known art. Said liquid/dirt can reach the pilot valve 45, blocking its operation.

The inventive novelty is the positioning, along the path of the connecting conduit 44, of a non-return valve 50 allowing the circulation of air in the direction indicated by the small white arrows in FIG. 6.

The non-return valve 50 blocks the undesired upwelling of liquid/dirt inside the connecting conduit 44, preventing it from reaching the pilot valve 45, which would jeopardize its working. In case liquids/dirt flow along the connecting conduit 44 up to the position 51 (FIG. 7) at the entry of the connecting conduit 44, they are suctioned/expelled during the successive aperture step of the suction valve 40.

FIG. 8 shows the successive condition of the suction valve 40, wherein when suction is active, the switching of the closed valve 40 occurs, due to the reinsertion of the cannula terminal 18 into the assistant's table 5.

The closing of the suction valve 40 occurs through the electrical switching of the pilot valve 45, opening the passage of environmental air, coming from conduit 47, and at the same time blocking the connecting conduit 44. In this condition, the atmospheric pressure works on the surface of the diaphragm 42 in the chamber 46. The diaphragm 42 lowers flexing on the opposed side, also thanks to the depression in the output conduit 43, blocking the passage of air in the conduit.

Figure 9:
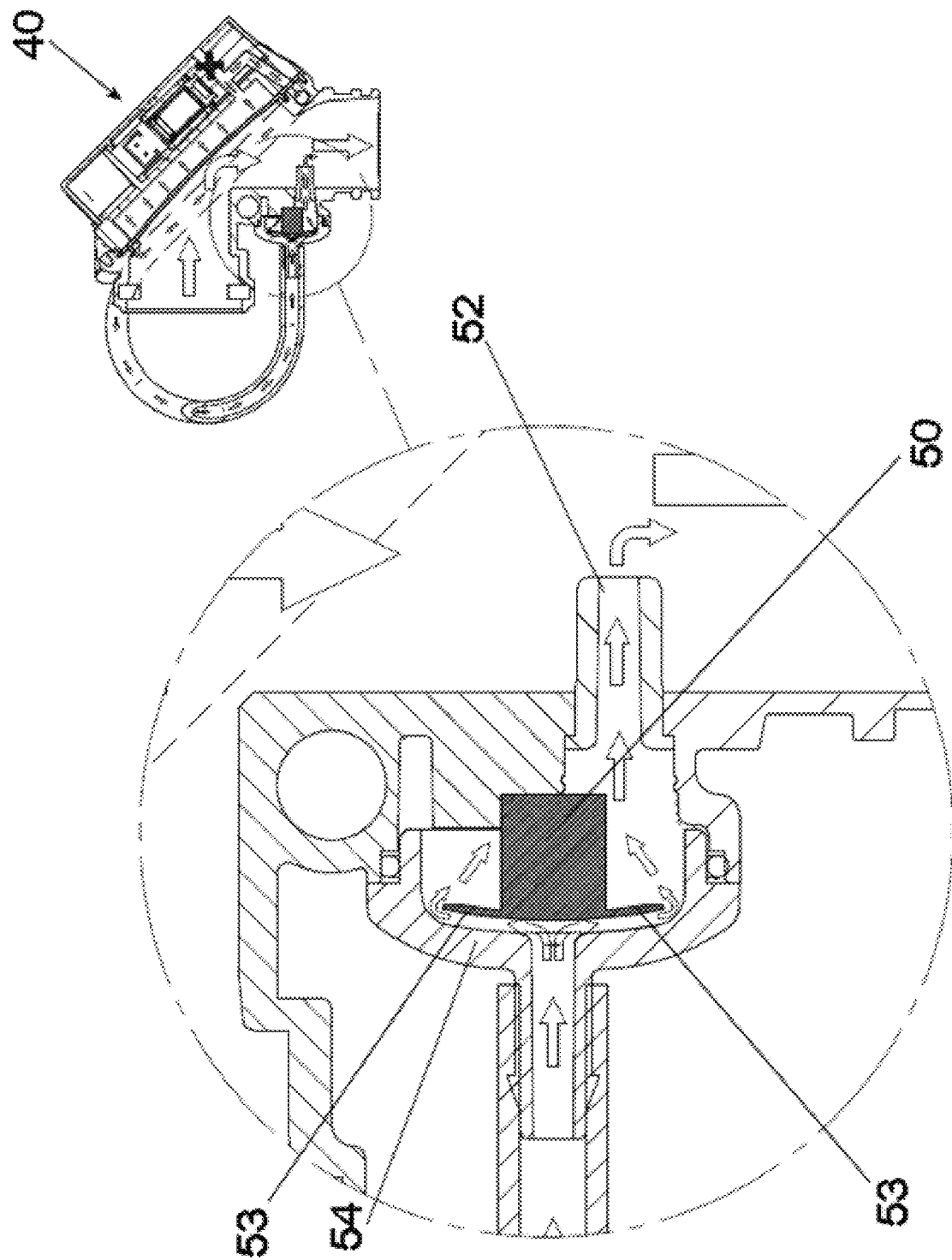
FIG. 9 shows a magnification of the detail of the non-return umbrella valve taken from FIG. 6.
Figure 10:
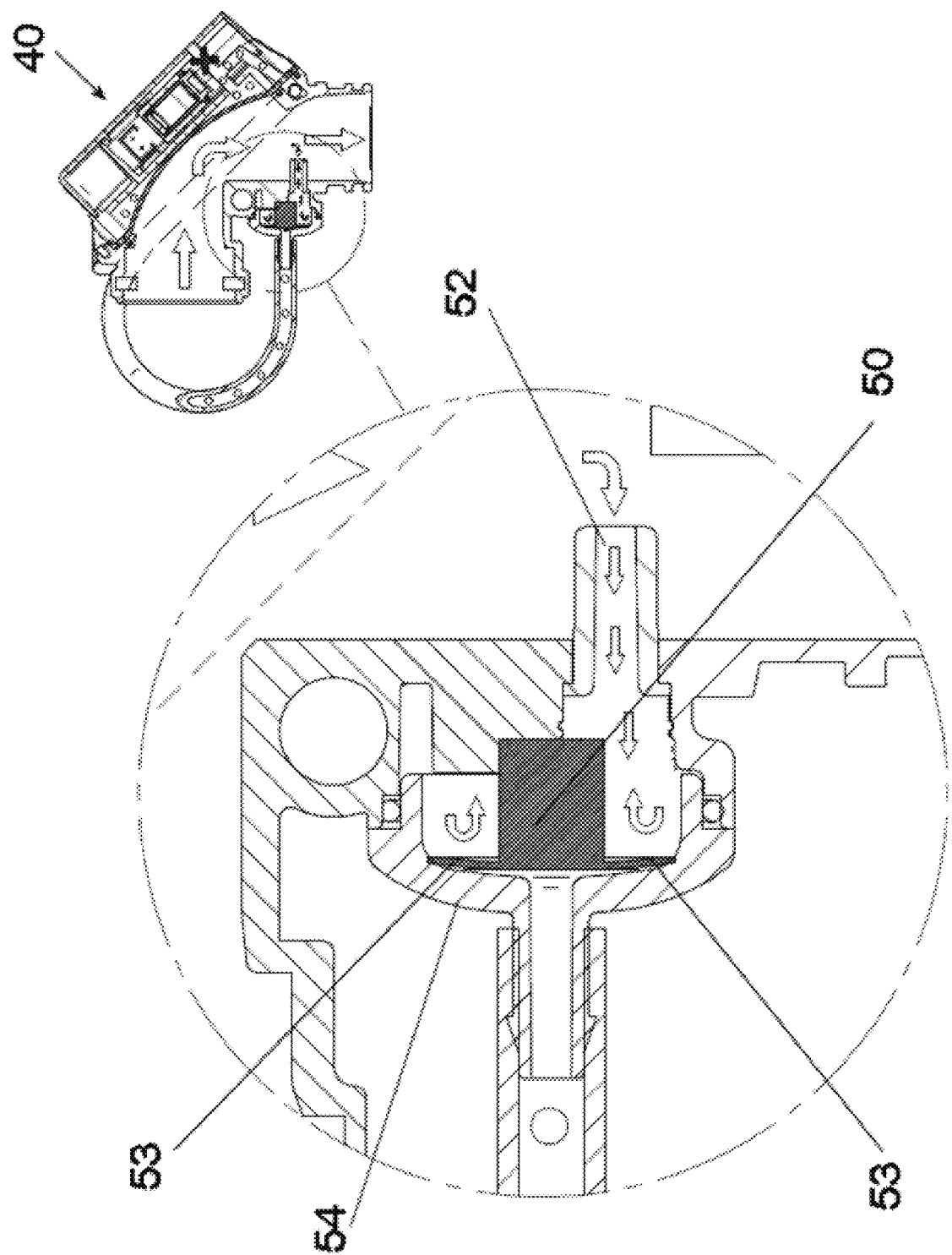
FIG. 10 shows a magnification of the detail of the non-return umbrella valve taken from FIG. 7.

FIG. 9 and FIG. 10 show two magnified views that clarify the working of the preferred embodiment of the present invention, wherein as non-return valve 50 there is provided an umbrella valve.

FIG. 9 shows the moment when the suction valve 40 is opening. The umbrella non-return valve 50 is in its natural conformation, blocking the passage of liquids from the entry point 52 of the connecting conduit 44 to the pilot valve 45.

The lip 53 is pre-loaded against the surface of the housing 54 of the non-return valve, ensuring a seal even with turbulences of the airflow entering in the housing of the non-return valve.

FIG. 10 shows the moment when the suction valve is opened. The air (indicated by the small white arrows) thrusts on the lip 53 of the umbrella non-return valve flexing it, and this allows the passage of air from the connecting conduit 44 to the output conduit 43.

It is worth noting that the entry point 52 of the connecting conduit 44 plays a significant role. Experimentally, it was shown that when said entry point 52 is at grade with respect to the output conduit 43, the entry of liquids and dirt is easier. On the other hand, an entry point 52 protruding in the output conduit 43 reduces the contamination. In particular, the entry point 52 must protrude in the output conduit 43 for some millimetres.

The suction valve according to the known art, lacking the non-return valve, works properly only when the input conduit 41 is parallel to the ground and/or the output conduit 43 is perpendicular to ground. Any tilting with respect to this position worsens the working of the suction valve, so that the entry of dirt/liquid is facilitated into the connecting conduit 44. It was experimentally shown that the suction valve according to the known art works in a better or worse way according to its tilting.

The introduction of the non-return valve 50 improves this problem, too, allowing to install the suction valve 40 with any tilting. This allows an improved flexibility in the installation of the suction valve 40 in the dental treatment unit 1. Taking into account the crowding of the sundry components inside the water unit 3, this is a significant benefit.

LIST OF REFERENCE NUMBERS 1 dental treatment unit
2 patient chair
3 water unit
4 dentist's board
5 assistant's board
6 screen
7 intraoral X-ray unit
8 control console
9 foot control
10 operating lamp
11 water-to-cup spout
12 dental instruments
13 bowl
14 suction cannula
15 suction tubes
18 cannula terminal
19 conduit
23 conduit
25 diaphragm
27 chamber
30a conduit
40 valve
41 input conduit
42 diaphragm
43 output conduit
44 connecting conduit
45 pilot valve
46 chamber
47 conduit
48 closing point
49 conduit
50 non-return valve
51 dirt upwelling point
52 entry point of the connecting conduit
53 lip of the umbrella valve
54 housing of the umbrella valve

The invention claimed is:

1. A suction valve for a dental treatment unit, the suction valve being adapted to be connected through tubings to a suction system placed downstream of the dental treatment unit, the suction valve comprising:
   an input conduit;
   an output conduit configured to be connected to the suction system, the output conduit being disposed perpendicularly to the input conduit and sharing a common edge at a connection therewith;
   a valve seat interposed between the input and output conduits;
   a diaphragm placed transversally to the input and output conduits and defining a chamber above the diaphragm, the diaphragm being mobile between a first resting position, wherein the diaphragm adheres against the valve seat blocking a passage of air and liquids between the input conduit and the output conduit, and a second active position, wherein the diaphragm is distanced from the valve seat, thereby allowing the passage of the air and the liquids between the input conduit and the output conduit;
   a connecting conduit having an entry point and allowing air passage between the chamber and the output conduit; and
   an electrically controllable pilot valve switchable between:
      a resting position, wherein the pilot valve allows passage of environmental air to the chamber through a terminal portion of the connecting conduit embedded in a body of the suction valve, the pilot valve comprising a first portion, a closing point, and a second portion, and
      an active position, wherein the pilot valve blocks the passage of the environmental air, and connecting the chamber with the output conduit through the connecting conduit;
   wherein, at an insertion point of the connecting conduit in the output conduit, there is provided a non-return valve preventing an input flow to the connecting conduit from the entry point, thereby preventing an upwelling of liquids from the output conduit into the connecting conduit and to the pilot valve and/or to the chamber.

2. The suction valve according to claim 1, wherein the non-return valve is selected from the group consisting of duck bill valves, ball valves, and umbrella valves.

3. The suction valve according to claim 1, wherein the entry point of the connecting conduit is perpendicular to the output conduit and protrudes inside the output conduit.

4. The suction valve according to claim 1, wherein the connecting conduit is placed outside the body of the suction valve for a portion of a length of the connecting conduit.

5. The suction valve according to claim 1, wherein the suction valve is connected upstream to a suction tube ending in a cannula terminal and downstream to the suction system.

6. The suction valve according to claim 1, wherein the suction valve is interposed along a tubing connecting the dental treatment unit to the suction system.

7. The suction valve according to claim 1, wherein the suction valve is configured to be installed tilted in multiple directions of an available space, whereby the input conduit is not parallel to a ground.

8. The suction valve according to claim 1, wherein the non-return valve is an umbrella valve that is pre-loaded so as to cause, in a resting condition, a sealing of the connecting conduit.

9. The suction valve according to claim 1, wherein the suction valve is produced through a printing process of polybutylene terephthalate.

* * * * *